(No Model.)
J. P. MEYER.
CONSTRUCTION AND PAVING BLOCK.
No. 452,412. Patented May 19, 1891.
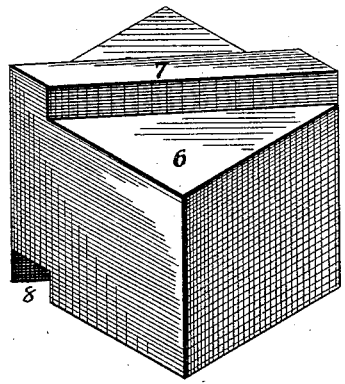
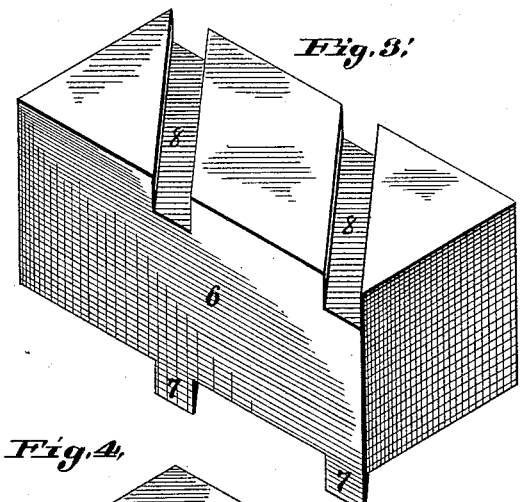
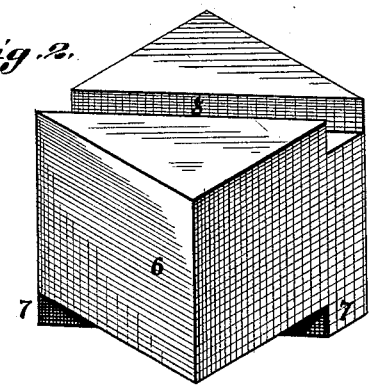
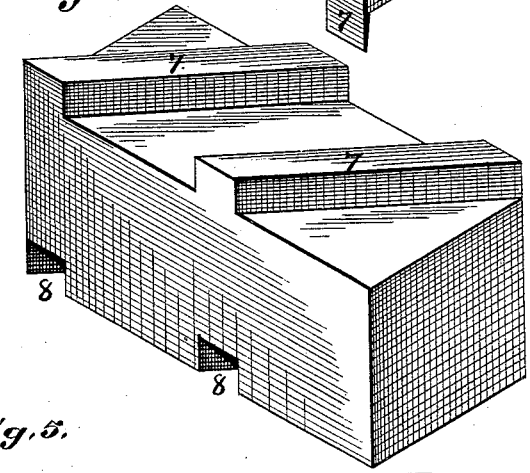
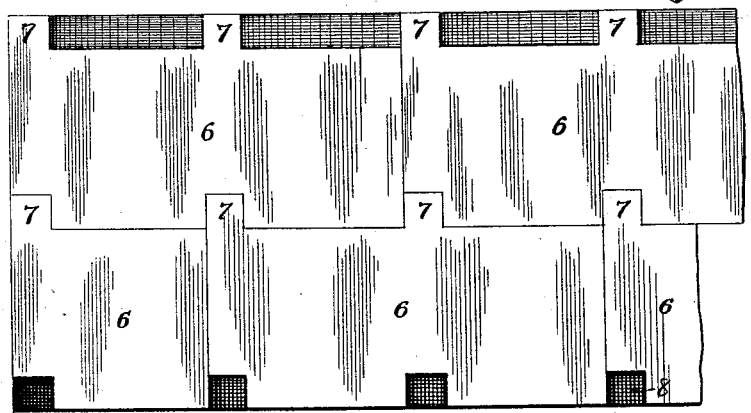

UNITED STATES PATENT OFFICE.

JOHN P. MEYER, OF ST. LOUIS, MISSOURI.

CONSTRUCTION AND PAVING BLOCK.

SPECIFICATION forming part of Letters Patent No. 452,412, dated May 19, 1891.

Application filed July 19, 1890. Serial No. 359,289. (No model.)

*To all whom it may concern:*

Be it known that I, JOHN P. MEYER, a citizen of the United States, residing at St. Louis, in the State of Missouri, have invented a certain new and useful Improvement in Construction, Building, and Paving Blocks, of which the following is such a full, clear, and exact description as will enable any one skilled in the art to which it appertains to make and use the same, reference being had to the accompanying drawings, forming part of this specification.

The object of my invention is to make a block which may be used for various purposes and which will be held firmly to the adjoining blocks and prevented from shifting its position in any direction, and at the same time may be used with the same facility as an ordinary block to make a smooth unbroken surface with one layer or course of blocks.

The invention consists of a rectangular block having one or more diagonal tongues upon one face thereof and one or more corresponding diagonal grooves upon the opposite face.

The invention will be best understood by referring to the accompanying drawings, forming a part of this specification, in which—

Figure 1 is an isometric projection of a building-block with one diagonal tongue and groove in accordance with my invention. Fig. 2 is a similar view showing the block inverted; Fig. 3, an isometric projection of a building-block having two diagonal tongues and grooves; Fig. 4, a view the same as the latter, showing the block inverted; and Fig. 5, a plan view illustrating how the blocks are used and applied in building any structure.

The same figures of reference indicate the same parts in the different views.

6 is a rectangular block of wood, metal, glass, stone, or plastic material, having on one of its six faces a diagonal groove or rib 7 and in the opposite face thereof a corresponding diagonal groove 8. The blocks are applied as shown in Fig. 5, and are generally provided with two diagonal tongues and grooves, as shown in Figs. 3 and 4; but for the purpose of piecing out a structure and making the end lines of junction of the blocks break joint with one another blocks with one diagonal tongue or groove, as shown in Figs. 1 and 2, are also provided.

The diagonal tongue and groove subserves a very important function, in that it holds the blocks in the same plane when put together and prevents any shifting of position of the individual blocks. A block when provided with a diagonal groove, in order to sink or pass out of the plane of the other blocks, must shift laterally, and this is prevented by the ends of the blocks abutting against the other blocks. A diagonal groove and rib is the only kind of rib that will accomplish this result. It is preferable to have the end lines of junction of the blocks break joint with each other, in order that one block may span or bridge two adjoining blocks and hold such blocks together. Were the diagonal tongues and grooves of the blocks made to engage one another without breaking joint, the blocks abutting against the ends of the same would be independent of the other blocks and not held to them. The end blocks of anything made out of these blocks when not confined may be removed either by raising them up (the diagonal grooves causing them in their movement to shift laterally) or by withdrawing the diagonal tongues of the blocks at the side laterally from the diagonal grooves of the adjacent blocks. Then the other blocks may be removed; but these other blocks cannot be withdrawn until the adjoining blocks have been removed. Such a block may be used for paving, building, or constructing almost anything. The diagonal grooves thereof firmly knit the blocks together and prevent their displacement. If anything constructed of such blocks be supported and confined around the edges, it will remain intact and the blocks in the center sustained and held in place by the diagonal ribs without other support. The blocks are therefore self-sustaining. Such a block is therefore very useful for paving purposes, as it will not sink and change its level with reference to the other blocks, but forms therewith in effect one continuous unbroken level surface, the individual members of which may be taken up for repair, &c., when properly manipulated, as indicated above. Such a block may be easily and cheaply manufactured.

It will be noted that only one layer or course of blocks is needed to make a smooth unbroken surface, and that in one course or layer of the blocks the individual blocks are locked together from displacement in an upward and downward direction. It is obvious that a structure may be made of one or more single layers or courses of the blocks, as desired. The said blocks may be provided with any number of diagonal tongues and grooves, and I do not wish to confine my invention to any specific number of diagonal tongues and grooves with which the blocks are furnished.

It is advantageous to make some of the blocks of less length and with fewer diagonal tongues and grooves than the others, in order that the blocks may break joint with each other; but it is not necessary that a block with one diagonal groove should be used for this purpose.

Having fully set forth my invention, what I desire to claim and secure by Letters Patent of the United States is—

A structure or pavement made up of a single layer or course of substantially rectangular blocks, each having one or more diagonal tongues and corresponding grooves on two opposite side faces thereof, respectively, the ends of said rectangular blocks abutting against each other the full height of the blocks and each block spanning the end lines of junction of adjoining blocks, whereby a smooth unbroken surface is formed with one layer or course of blocks and each individual block in said one course or layer is locked in position against displacement in an upward and downward direction, substantially as and for the purpose described.

In testimony whereof I have hereunto set my hand and affixed my seal, this 14th day of July, 1890, in the presence of two subscribing witnesses.

JOHN P. MEYER. [L. S.]

Witnesses:
A. C. FOWLER,
M. S. REEDER.